United States Patent [19]

Theyse

[11] 4,179,951
[45] Dec. 25, 1979

[54] FLYWHEEL ROTOR PARTICULARLY SUITABLE FOR ACCUMULATING ENERGY

[75] Inventor: Frederik H. Theyse, Bensberg-Herkenrath, Fed. Rep. of Germany

[73] Assignee: Stichting Energieonderzoek Centrum Nederland, The Hague, Netherlands

[21] Appl. No.: 749,270

[22] Filed: Dec. 10, 1976

[30] Foreign Application Priority Data

Dec. 18, 1975 [NL] Netherlands ............... 7514749

[51] Int. Cl.² ............... F16F 15/30; F16D 3/52; F16D 3/56
[52] U.S. Cl. ............... 74/572; 64/11 B; 64/15 R; 308/26; 74/574
[58] Field of Search ............... 74/572, 574; 64/11 R, 64/11 B, 27 L, 13, 15 R; 308/26, 184 R

[56] References Cited

U.S. PATENT DOCUMENTS

| | | | |
|---|---|---|---|
| 2,207,496 | 7/1940 | Anderson, Jr. ............... | 64/11 R |
| 2,251,804 | 8/1941 | Reuter et al. ............... | 64/11 R |
| 2,906,572 | 9/1959 | Wroby ............... | 308/184 R |
| 3,639,015 | 2/1972 | Maas ............... | 308/26 |
| 4,000,665 | 1/1977 | Rabenhorst ............... | 74/572 |

FOREIGN PATENT DOCUMENTS 431343  6/1974  U.S.S.R. ............... 74/572

*Primary Examiner*—Samuel Scott
*Assistant Examiner*—Don E. Ferrell
*Attorney, Agent, or Firm*—Cushman, Darby & Cushman

[57] ABSTRACT

Flywheel rotor, particularly suitable for accumulating energy, built up from separate flywheels which are interconnected by means of an elastic link. The link may have the form of a solid of revolution comprising at least a single, relatively thin-walled bellows fold.

At least one fold wall of the bellows fold may have the form of a truncated cone. The rotor may comprise cylindrical rotor parts as well as unperforated disks of Laval-shape.

3 Claims, 3 Drawing Figures

FLYWHEEL ROTOR PARTICULARLY SUITABLE FOR ACCUMULATING ENERGY

The invention relates to a flywheel rotor which is particularly suitable for accumulating kinetic energy of rotation. Prior-art rotors of this kind had the drawback of being too rigid, causing the critical speed to become too high. This entailed subcritical operation in practice, meaning that the operational speed was lower than the critical speed. As explained in Netherlands patent application No. 75.14.748. This is very disadvantageous with respect to the bearing losses.

According to the invention, such a flywheel rotor is designed so that the rotor, with the aim of increasing the accumulating capacity, is assembled from separate flywheels which are then mutually connected by means of an elastic link. A practical embodiment of such an elastic link is obtained by using a solid of revolution comprising at least a single, relatively thin-walled bellows fold. Such a rotor readily allows the critical speed to be made so low that operation at a speed above critical becomes possible, as a result of which the bearing losses become appreciably smaller than is the case with more rigid rotors.

If the bellows fold faces the axis of rotation of the rotor, the tangential stress in the material of the bent-over portion of the bellows fold can be kept at a minimum value. The elasticity will be improved if the bellows fold is provided with at least one wall located in a plane surface perpendicular to the axis of rotation of the rotor.

When such a flywheel rotor comes up to speed, it must necessarily pass through the region of critical speed in order to reach the higher operational speed of rotation. While this critical speed region is being passed, the rotor is briefly exposed to vibrations. As a result of these vibrations, during which the center line of the rotor can assume a vibrational form comprising one or more nodes and loops, the rotor is subjected to transverse forces which affect especially the elastic links.

The applicant has found that these transverse forces can best be sustained by the relatively thin fold walls if at least one fold wall in a bellows fold has the form of a truncated cone.

For the attachment, use is preferably made of an electron beam weld, in such a way that a construction is obtained where the bellows fold comprises at least two fold walls which are connected by a bent-over portion and the other edges of which are fixed by the aforementioned welding method to the rotor components which adjoin the elastic link. It can be advantageous for the quality of the weld if a bellows-fold edge is thickened at the point where the weld is made.

In attaching the shaft journals to the rotor, it will be advantageous to use a structure in which the outside flywheels have a smaller outside diameter than the intermediate wheels. These smaller flywheels can then serve for attaching to them, for example, the shaft journals, or one or more magnets by which a rotor end is supported. This magnetic support is described in greater detail in Netherlands patent application No. 76.06.441. This method of construction prevents the largest, and therefore most heavily loaded, flywheels from being subjected to a stress disturbance resulting from connecting members near the axis of rotation. This construction furthermore enhances the elasticity of the rotor.

Especially if the bellows fold bulges outwardly, it can be advantageous for the stress distribution as well as for the elasticity to provide the fold with a number of slits which are uniformly distributed along the periphery and which penetrate into the fold over only part of the depth of the fold.

An example of embodiment of the invention will be explained in further detail on the basis of the following figures, of which:

Figure 1:
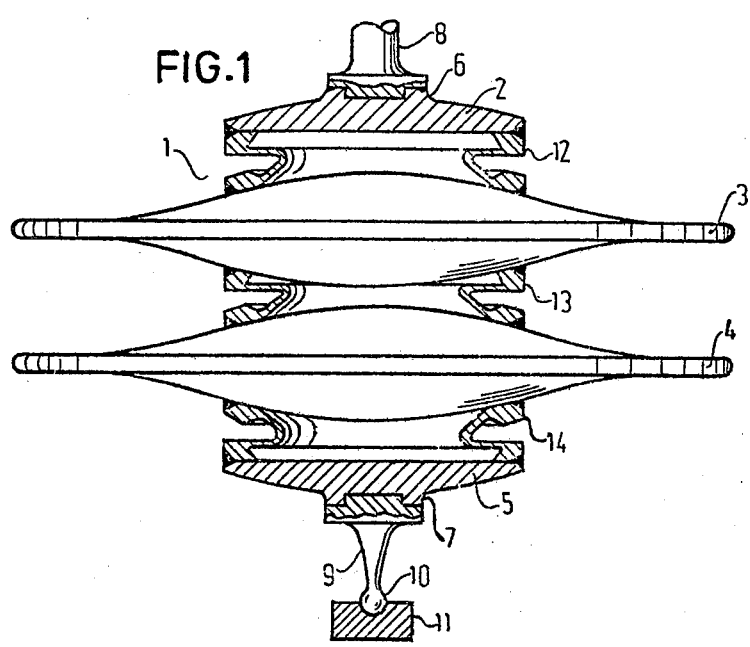
FIG. 1 is a vertical cross section through a flywheel rotor according to the invention.

FIG. 1 shows a flywheel rotor 1 which is assembled from four flywheels 2, 3, 4 and 5. The flywheels 3 and 4 have predominantly the shape of a Laval disc, i.e., a disc of uniform strength which is thereby optimally suited for accumulating flywheel energy because the highest peripheral velocities can be attained with it. The flywheels 2 and 5 are provided with flat surfaces on their sides facing inside, their outside surfaces being provided with hub portions 6 and 7 respectively, into which a shaft journal 8 and a pivot 9 respectively can be fitted. The figure indicates schematically that such a pivot 9 can be supported by a pivot sphere 10 at its lower end in a bearing block 11 which is provided with a pivot socket.

Elastic links 12, 13 and 14 are provided between the flywheels 2 and 3, 3 and 4, and 4 and 5 respectively.

Figure 2:
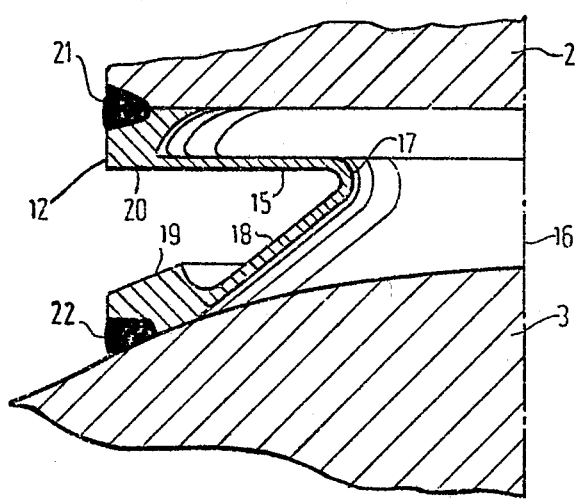
FIG. 2 is a detail of FIG. 1 showing a transverse section through an elastic link.

FIG. 2 shows the shape of such an elastic link on an enlarged scale. It consists of a relatively thin wall 15 which is perpendicular to the axis of rotation 16. At 17, this wall is bent over to a conical extension 18 which ends in a thickened portion 19. The part 15 terminates on its outside in a thickening 20. This thickening is affixed by a welded seam 21 to the rotor wheel 2. Similarly, the thickened wall 19 is affixed by a welded seam 22 to th flywheel 3.

Figure 3:
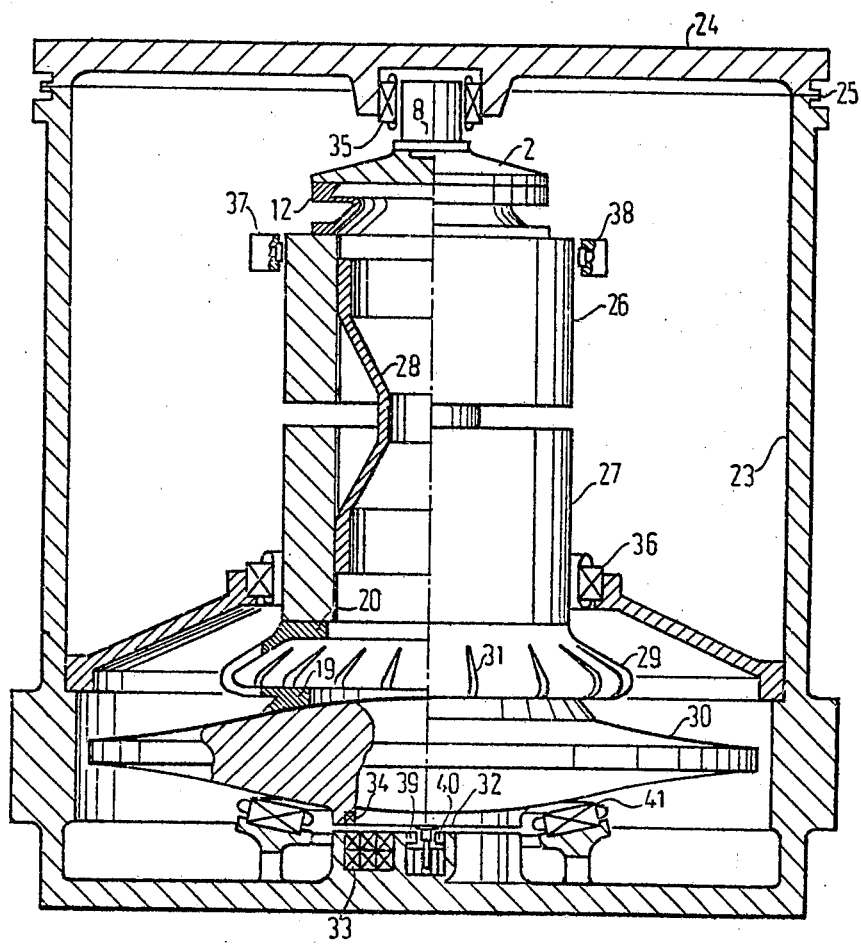
FIG. 3 is a partial vertical cross section through a flywheel set in which some variants of elastic links are used.

FIG. 3 shows that the elastic links described can also be used for establishing a connection between cylindrical parts which function as a composite flywheel, and between cylindrical and Laval-type rotor parts. The elastic joints in the form of a truncated cone can be single or double, and can either be folded inwards or bulge outwards. The elasticity can be improved by providing a number of radial slits in an edge of the fold.

High vacuum is maintained inside a housing 23 which is closed with a lid 24. A weld 25 provides the required sealing effect.

The flywheel rotor is composed of two thick-walled cylinders 26 and 27, which are connected to each other by an elastic link 28 having the form of a double conical frustrum. On the underside a single, outwardly bulging conical elastic link 29 forms a connection to the Laval-type wheel component 30. The bellows fold 29 is provided at regular intervals with slits 31 which, besides having the aforementioned advantage, prevent high tangential stresses from developing in the periphery of the fold. The change in thickness of the walls of 29 is preferably selected so that the stress distribution in these walls is as uniform as possible during rotation.

The wheel 30 rests with a flat lower flange 32 on a magnetic support bearing 33 consisting of magnetic rings which repel the magnet rings 34 in wheel 30. This type of magnetic bearing is described in greater detail in patent application B80 Netherlands. A description is there also given of the proper operation of the magnetic support bearings 35 and 36, as well as of the position detector 37, 38, 39, and 40, which control the magnetic bearings 35 and 36. An electric motor-generator unit 41 supplies energy to, or extracts energy from, the rotor.

I claim:

1. A flywheel rotor suitable for accumulating kinetic energy of rotation at high rotational speed, in which the rotor is assembled from at least two separate coaxial flywheel components which are interconnected by means of an elastic metallic link, said elastic metallic link having the form of a solid of revolution comprising one single, relatively thin-walled bellows fold facing the axis of rotation, the bellows fold having two fold walls which are connected to each other by a bent-over portion, the bellows fold also having end edges which are affixed to the flywheel components adjoining the elastic link, one of said end edges at the location of its attachment to the respective flywheel component being thickened relative to the thickness of the adjacent fold wall, one fold wall of the bellows fold having the form of a truncated cone, the other wall of the fold being flat and located in a plane surface perpendicular to the axis of rotation of the rotor, said fold being provided with a number of narrow, closed radial slits penetrating from the extremity of the fold partially into both fold walls equally, the slits being uniformly distributed along the periphery of the fold.

2. A flywheel rotor according to claim 1, wherein the flat wall of a fold is affixed to the flat surface of a flywheel component.

3. A flywheel rotor according to claim 2 wherein one of said flywheel components is a solid homogeneous component that is not pierced and that is profiled so that its thickness changes from the axis of rotation to a point at or near the periphery of the wheel according to a pattern corresponding to the thickness variation of a disc of uniform strength, also called a Laval disc, wherein one side of the said disc exhibits from the centre outwards a flat surface, perpendicular to the axis of rotation, the end edge of said flat wall of the fold being affixed to said flat surface.

* * * * *